Patented May 27, 1941

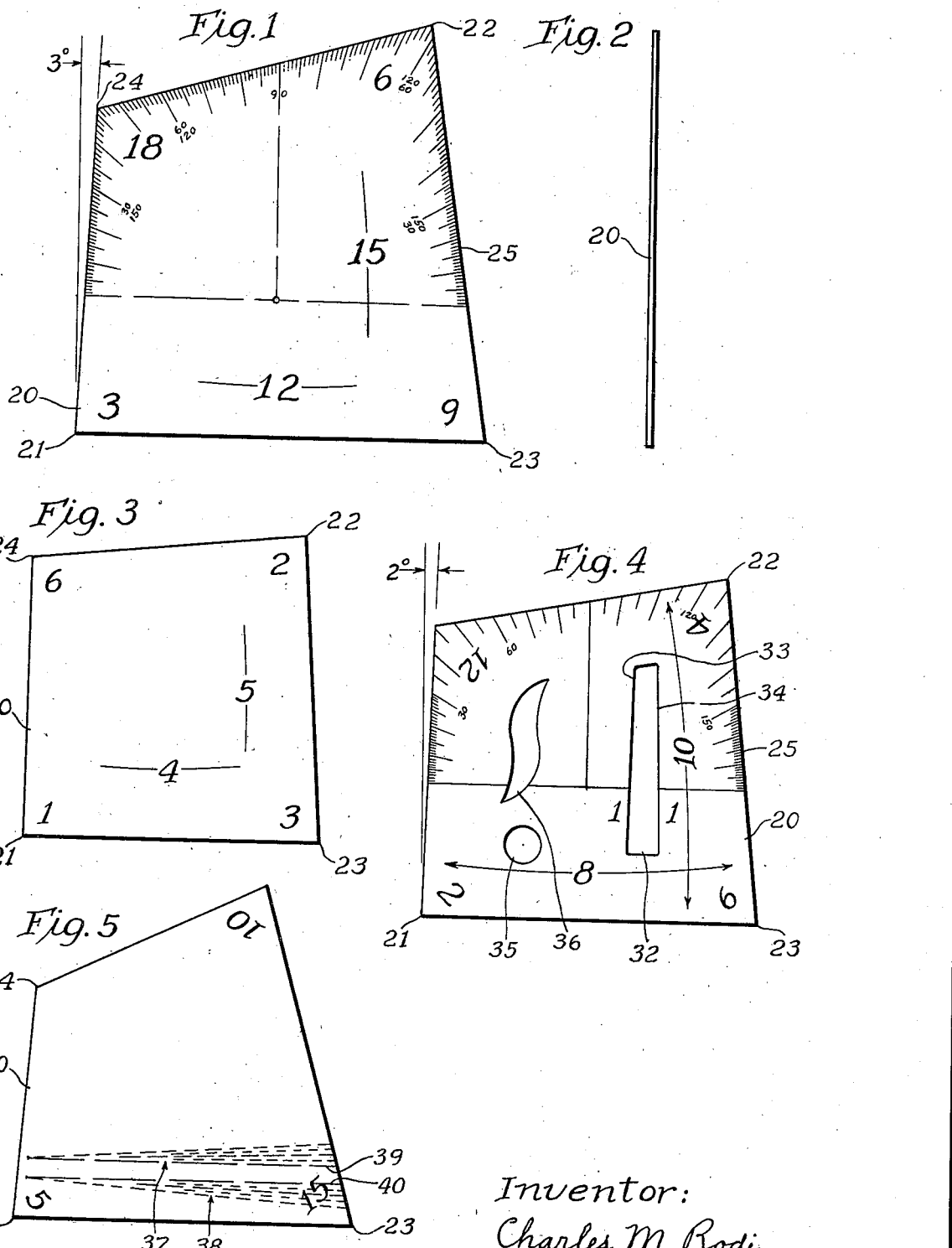

2,243,579

UNITED STATES PATENT OFFICE 2,243,579

PROTRACTOR

Charles M. Rodi, Chicago, Ill.

Application June 28, 1940, Serial No. 343,010

1 Claim. (Cl. 33—104)

This invention relates to protractors or devices that are useful in drawing lines at various angles.

An object of the invention is to provide means whereby lines disposed at angles with the horizontal or vertical may be more expeditiously drawn in certain situations which arise in the course of a draftsman's work. Another object is to provide a combination of the common form of angular protractor which is useful in laying out or reading an angle, with a device which renders more expeditious the drawing of lines or comparing of angular magnitudes at certain angles or in certain instances.

Fig. 1 is a plan view of an embodiment of the invention.

Fig. 2 is an end view of Fig. 1.

Fig. 3 shows a plan view of a modified form of the device shown in Fig. 1.

Fig. 4 is a modified form of the device of Fig. 3.

Fig. 5 is a modified form of the device of Fig. 4.

It will be appreciated that ordinarily lines at an angle of 45 degrees with the horizontal on a drawing may be more expeditiously drawn by using a draftsman's 45 degree triangle in connection with a T-square or equivalent horizontal straight-edge, than by laying out the angle with the common angular protractor comprising a center and a scale of 180 degrees and then producing the line according to this determination in proper location upon the drawing. Similarly lines inclined at angles of 30 or 60 degrees with the horizontal or vertical may be very conveniently drawn using a draftsman's 30-60 degree triangle. Using the embodiment of this invention shown in Fig. 1, lines at angles of 3, 6, 9, 12, 15, and 18 degrees with the horizontal or vertical, or in some cases with other reference lines, as will be explained later, may likewise be drawn with especial convenience and accuracy, without pointing off the angle; while at the same time, angles which are not thus especially expeditiously obtained may be laid out in the usual manner by means of the protractor scale on the device. Other embodiments of the invention are especially expeditious in the drawing of other angles.

Referring now to the drawing, wherein like designation numerals refer to corresponding parts thruout the several views, 20 designates in its entirety the protractor device whose four sides or edges are limited by its corners, 21, 22, 23, and 24. In the embodiment of the invention shown in Fig. 1, the angle formed by the intersection of the edge 21—23 with the edge 21—24 is 87 degrees and the complement of this angle is therefore three degrees as shown in the drawing and the numeral 3 is accordingly marked on the device in corner 21. The angle 22 formed by the sides 22—24 and 22—23 which meet to form the corner diagonally opposite corner 21, is made of such magnitude that its complement is twice as great as the complement of angle 21, that is angle 22 in Fig. 1 is 84 degrees and its complement is 6 degrees and the numeral 6 is placed in corner 22. Angle 23 is made of such magnitude that its complement is three times as great as the complement of angle 21 and in Fig. 1 the numeral 9 is placed in corner 23. Angle 24 and the slopes of the various sides relative to each other are now determined. Sides 21—24 and 23—22 if extended would meet at an angle of 12 degrees, that is they lie disposed at an angular inclination with each other of 12 degrees. Edges 22—24 and 23—21 lie disposed at angular inclination with each other of 15 degrees. Angle 24, still referring to Fig. 1, is 108 degrees and the difference between it and 90 degrees is 18 degrees. The numerals 12, 15, and 18 are plainly marked as illustrated in Fig. 1 on the device, which I prefer to make of transparent material. In the embodiment of the invention shown in Fig. 3 the smallest complement of a corner angle is one degree, in Fig. 4 the smallest complement is two degrees and in Fig. 5, five degrees. In more general terms, where the smallest complement of a corner angle of the device in the form of a quadrilateral is $n$ degrees, the complement of the diagonally opposite corner angle is $2n$ degrees, and the complement of one of the other corner angles is $3n$ degrees.

In drawing with instruments, the T-square or equivalent guiding straight-edge is normally in horizontal position, and the vertical lines on the drawing, that is the lines which are conventionally designated as vertical, are produced by laying one of the two edges of a draftsman's triangle which form the 90 degree angle, in contact with the T-square and using the other as guide in producing the vertical line. Similarly the protractor of Fig. 1 may be used to produce a line at an angle of three degrees with the vertical by laying edge 21—23 along the horizontal straight-edge and using edge 21—24 as a guide to draw the line. Also to draw another line at an inclination of three degrees with the vertical but inclined in the opposite direction, the protractor may be rotated about corner 21 thru an angle of a little more than 90 degrees to bring edge 21—24 into contact with the horizontal straight-edge and the edge 21—23 is then used as guide. It frequently happens that pairs of lines each of which has the same angle of inclination with the vertical or horizontal but each inclined in opposite direction to the other are encountered and in such instances the device is especially useful. Using the edges of corner 22, lines inclining to right and left at angles of six degrees with the vertical may be obtained. Likewise using the edges forming angle 23, lines at nine degrees with the vertical may be obtained. Moreover by laying edge 22—23 or edge 24—21 in contact with a vertical straight-edge such as the vertically disposed edge of a draftsman's triangle and drawing along edge 24—21 or edge 22—23, lines at an inclination of 12 degrees with the vertical may be produced. Using edges 24—22 and 21—23 in similar manner, lines at 15 degrees with the vertical may be drawn. Also working about corner 24 from a horizontal straight-edge, lines at 18 degrees result. Also these same inclinations with the horizontal instead of with the vertical may be obtained in similar manner, but with a vertical straight-edge used in place of a horizontal one and a horizontal where in the other case a vertical straight-edge was employed. It is evident that the invention, provided with an angular scale, 25, is an angular protractor, and may be expeditiously used as such, like the semicircular angular protractor, while in addition it is especially useful and expeditious in drawing tapers and in laying out certain angles predetermined by its configuration.

Also by using the device in connection with the hypothenuse of a 30-60 degree triangle, angles at these same inclinations with 30 degree or 60 degree lines may be conveniently obtained. Thus using the device of Fig. 1 and the common 30-60 degree triangle in connection with a T-square or equivalent, angles at intervals of three degrees thruout the entire range of 360 degrees may be drawn. Using also the device of Fig. 3 in connection with these, angles at intervals of one degree thruout the entire 360 degree range may be similarly drawn.

Groups of lines, 37 and 38, here shown as broken lines, which may be advantageously used on the under-side of transparent material such as Celluloid, represent partial scales and illustrate the combination of partial scales with a sheet of material so shaped as to form a protractor of the type described. Lines 39 and 40 are both parallel to edge 21—23. In group 37 there are also, besides line 39, four lines which make angles of 1, 2, 3, and 4 degrees with edge 21—23. In group 38 there are also similar lines making like angles with edge 21—23 but inclined in opposite direction. It is evident that these lines increase the number of angles obtainable by means of the protractor of Fig. 5 and that they are especially suitable for use in connection with edge 21—23. In the embodiment of the invention of Fig. 4 is shown a slot 32 provided with sides 33 and 34 making tapering one degree angles with a perpendicular to edge 21—23 thus increasing the number of angles which are obtainable without pointing off and apertures 35 and 36 are also provided for convenience in making other markings. These illustrations show how the scope of the invention may be increased by incorporation within its embodiments of such devices.

I claim:

A device useful in drawing lines at various angular inclinations, comprising a sheet of material of quadrilateral configuration, one of the angles of the quadrilateral being of such magnitude that its complement is not greater than five degrees, and the angular relations of the quadrilateral edges with each other being as follows: that angle of the quadrilateral which is diagonally opposite the above mentioned quadrilateral angle is of such magnitude that its complement is twice the first mentioned complement and either one of those angles of the quadrilateral which are adjacent to the last mentioned quadrilateral angle is of such magnitude that its complement is three times the first mentioned complement; whereby when the device is used in connection with standard drawing equipment such as a drawing board and T-square it is useful in producing lines at a series of angular inclinations with a first direction on the drawing board, as for instance the vertical or the horizontal direction; one such obtainable angular inclination being twice the smallest of such angular inclinations, another angular inclination being three times the smallest, still another angular inclination, obtainable by an additive relationship, being four times the smallest, still another angular inclination, obtainable by a similar additive relationship, being five times the smallest, and still another or sixth angular inclination being six times the smallest; the possibility of obtaining this series of angles or inclinations being due to the construction of the quadrilateral sheet.

CHARLES M. RODI.